(12) United States Patent
Han et al.

(10) Patent No.: US 11,153,914 B2
(45) Date of Patent: Oct. 19, 2021

(54) DATA TRANSMISSION METHOD AND APPARATUS

(71) Applicant: Huawei Technologies Co., Ltd., Shenzhen (CN)

(72) Inventors: Yunbo Han, Shenzhen (CN); Hongcheng Zhuang, Dongguan (CN); Zhiming Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 16/638,043

(22) PCT Filed: Sep. 11, 2017

(86) PCT No.: PCT/CN2017/101273
§ 371 (c)(1),
(2) Date: Feb. 10, 2020

(87) PCT Pub. No.: WO2019/028965
PCT Pub. Date: Feb. 14, 2019

(65) Prior Publication Data
US 2020/0221501 A1   Jul. 9, 2020

(30) Foreign Application Priority Data
Aug. 11, 2017   (CN) .......................... 201710687119.4

(51) Int. Cl.
*H04W 74/08* (2009.01)
*H04L 27/06* (2006.01)
(Continued)

(52) U.S. Cl.
CPC ..... *H04W 74/0833* (2013.01); *H04L 27/2613* (2013.01); *H04W 72/0413* (2013.01); *H04W 72/14* (2013.01); *H04W 74/006* (2013.01)

(58) Field of Classification Search
None
See application file for complete search history.

(56) References Cited

U.S. PATENT DOCUMENTS

| 2016/0233990 A1 | 8/2016 | Yan et al. |
| 2018/0146495 A1 | 5/2018 | Xu et al. |

(Continued)

FOREIGN PATENT DOCUMENTS

| CN | 105264810 A | 1/2016 |
| CN | 106301739 A | 1/2017 |

(Continued)

OTHER PUBLICATIONS

R1-1713962, NTT Docomo, Inc., "Scheduling and HARQ procedures for URLLC," 3GPP TSG RAN WG1 Meeting #90, Prague, Czechia, Aug. 21-25, 2017, 4 pages.

(Continued)

*Primary Examiner* — Hong S Cho
(74) *Attorney, Agent, or Firm* — Conley Rose, P.C.

(57) ABSTRACT

A data transmission method includes: receiving, by a network device, uplink data sent by a terminal device based on a grant-free manner; and sending, by the network device, a response message for the uplink data to the terminal device according to a type of the response message for the uplink data, where the type of the response message for the uplink data is a first response type or a second response type, the first response type is that each time the terminal device sends the uplink data, the network device sends the response message for the uplink data to the terminal device once, and the second response type is that after the terminal device sends the uplink data for a plurality of times, the network device sends, to the terminal device once, the response message for the uplink data that is sent for the plurality of times.

20 Claims, 6 Drawing Sheets

(51) Int. Cl.
*H04W 72/14* (2009.01)
*H04L 1/18* (2006.01)
*H04L 27/26* (2006.01)
*H04W 72/04* (2009.01)
*H04W 74/00* (2009.01)

(56) References Cited

U.S. PATENT DOCUMENTS

2018/0199381 A1 7/2018 Rong et al.
2019/0327030 A1* 10/2019 Yoshimoto ............ H04L 1/1614
2020/0059322 A1* 2/2020 Lei ........................... H04L 1/18

FOREIGN PATENT DOCUMENTS

| | | | |
|---|---|---|---|
| CN | 106507497 | A | 3/2017 |
| CN | 106788912 | A | 5/2017 |
| EP | 3048750 | A1 | 7/2016 |
| WO | 2016167828 | A1 | 10/2016 |
| WO | 2016206083 | A1 | 12/2016 |
| WO | 2017000900 | A1 | 1/2017 |
| WO | 2017011944 | A1 | 1/2017 |

OTHER PUBLICATIONS

R1-1713956, NTT Docomo, Inc., "HARQ-ACK timing," 3GPP TSG RAN WG1 Meeting #90, Prague, Czechia, Aug. 21-25, 2017, 5 pages.
R1-1708525, Nokia et al., "UL grant-free HARQ operation for URLLC," 3GPP TSG-RAN WG1#89, Hangzhou, China, May 15-19, 2017, 6 pages.
R1-1703868, Huawei et al., "We on grant-free repetitions," 3GPP TSG RAN WG1 Meeting #88, Athens, Greece, Feb. 13-17, 2017, 2 pages.
R1-1710994, Nokia, et al., "UE identification and HARQ for URLLC UL grant-free," 3GPP TSG-RAN WG1 Ad-Hoc NR#2,Qingdao, China, Jun. 27-30, 2017, 5 pages.
R1-1711121, NTT Docomo, Inc.,"Scheduling and Harq procedures for URLLC," 3GPP TSG RAN WG1 NR Ad-Hoc#2,Qingdao, P.R. China, Jun. 27-30, 2017, 2 pages.
R1-1710723, Samsung, "Procedures for Grant-Free UL Transmissions," 3GPP TSG RAN WG1 NR Ad-Hoc#2, Qingdao, P.R. China, Jun. 27-30, 2017, 3 pages.
R1-1704223, Huawei, et al., "HARQ indication design for UL GF transmission," 3GPP TSG RAN WGI Meeting #88bis, Spokane, USA, Apr. 3-7, 2017, 5 pages.

* cited by examiner

DATA TRANSMISSION METHOD AND APPARATUS

CROSS-REFERENCE TO RELATED APPLICATIONS

This application is a national stage of International Application No. PCT/CN2017/101273, filed on Sep. 11, 2017, which claims priority to Chinese Patent Application No. 201710687119.4, filed on Aug. 11, 2017. Both of the aforementioned applications are hereby incorporated by reference in their entireties.

TECHNICAL FIELD

This application relates to the communications field, and more specifically, to a data transmission method and apparatus in the communications field.

BACKGROUND

In a future network system, a grant-free (grant free, grant-free, grantless, or without grant) manner will be introduced for data transmission. In the grant-free manner, a network device allocates a grant-free transmission resource to a terminal device, and the terminal device sends uplink data by using the grant-free transmission resource, so that the terminal device does not need to implement uplink data transmission by using a request. This reduces latency and signaling overheads. In the grant-free manner, when the terminal device sends the uplink data by using the grant-free transmission resource, no uplink scheduling is performed during both initial transmission and retransmission, the network device does not know how to send a response message for the uplink data to the terminal device, and the terminal device does not know how to receive the response message for the uplink data. Consequently, accurate transmission of the response message is not ensured.

SUMMARY

This application provides a data transmission method and apparatus, to improve transmission accuracy of a response message.

According to a first aspect, a data transmission method is provided, including: receiving, by a network device, uplink data sent by a terminal device based on a grant-free manner; and sending, by the network device, a response message for the uplink data to the terminal device according to a type of the response message for the uplink data, where the type of the response message for the uplink data is a first response type or a second response type, the first response type is that each time the terminal device sends the uplink data, the network device sends the response message for the uplink data to the terminal device once, and the second response type is that after the terminal device sends the uplink data for a plurality of times, the network device sends, to the terminal device once, the response message for the uplink data that is sent for the plurality of times.

In an embodiment of this application, the network device may send the response message to the terminal device according to the type of the response message for the uplink data. For example, when the type of the response message for the uplink data is the first response type, each time the terminal device sends the uplink data, the network device sends the response message to the terminal device once. For another example, when the type of the response message for the uplink data is the second response type, the terminal device sends the uplink data for a plurality of times, and the network device sends the response message to the terminal device once. Therefore, the network device sends the response message according to a corresponding response type, and the terminal device receives the response message according to the corresponding response type. For example, the network device determines a resource location at which the response message is sent, the network device sends the response message at a corresponding resource location, and the terminal device receives the response message at the corresponding resource location, to improve transmission accuracy of the response message.

More specifically, the network device sends the response message to the terminal device according to the type of the response message for the uplink data, so that the terminal device determines, according to the response message, whether the uplink data is accurately received. If the response message received by the terminal device is an acknowledgement (acknowledgement, ACK), it indicates that the uplink data is correctly received, and the terminal device does not need to retransmit the uplink data. If the response message received by the terminal device is a negative acknowledgement (negative acknowledge, NACK), it indicates that the uplink data is not correctly received, and the terminal device needs to retransmit the uplink data.

In some implementations, before the receiving, by a network device, uplink data sent by a terminal device based on a grant-free manner, the method further includes: sending, by the network device, first indication information to the terminal device, where the first indication information is used to indicate that the first response type corresponds to a first transmission resource, and the second response type corresponds to a second transmission resource, where the first transmission resource is different from the second transmission resource; and determining, by the network device, the type of the response message for the uplink data based on a transmission resource used for receiving the uplink data, where the transmission resource for the uplink data is the first transmission resource or the second transmission resource.

In this way, when the terminal device expects the network device to respond by using the first response type, the terminal device sends the uplink data on the first transmission resource, and the network device receives the uplink data on the first transmission resource and sends the response message to the terminal device by using the first response type. When the terminal device expects the network device to respond by using the second response type, the terminal device sends the uplink data on the second transmission resource, and the network device receives the uplink data on the second transmission resource and sends the response message to the terminal device by using the second response type.

In some implementations, the determining, by the network device, the type of the response message for the uplink data based on a transmission resource used for receiving the uplink data includes: if the transmission resource for the uplink data is the first transmission resource, determining, by the network device, that the type of the response message for the uplink data is the first response type; or if the transmission resource for the uplink data is the second transmission resource, determining, by the network device, that the type of the response message for the uplink data is the second response type.

In some implementations, the first transmission resource and the second transmission resource are transmission resources in time domain and/or frequency domain; or the first transmission resource and the second transmission resource are demodulation reference signal resources.

Optionally, the first transmission resource and the second transmission resource may alternatively be code domain resources, or the like. This is not limited in this embodiment of this application.

In some implementations, the sending, by the network device, first indication information to the terminal device includes: sending, by the network device, the first indication information to the terminal device by using a system message, radio resource control signaling, or a physical control channel.

In some implementations, before the receiving, by a network device, uplink data sent by a terminal device based on a grant-free manner, the method further includes: sending, by the network device, second indication information to the terminal device, where the second indication information is used by the terminal device to determine a response type of the response message for the uplink data.

In some implementations, the second indication information is used to indicate that the type of the response message for the uplink data is the first response type or the second response type.

In other words, when the second indication information indicates that the type of the response message for the uplink data is the first response type, the terminal device may determine that the type of the response message for the uplink data is the first response type; or when the second indication information indicates that the type of the response message for the uplink data is the second response type, the terminal device may determine that the type of the response message for the uplink data is the second response type.

In some implementations, the second indication information is used to indicate a response criterion used by the terminal device to determine the type of the response message for the uplink data. The terminal device may determine the type of the response message for the uplink data according to the response criterion.

In some implementations, the response criterion is that the type of the response message for the uplink data is the type of the response message sent for the uplink data by the network device when using a grant-based manner with the terminal device for the last time.

In some implementations, the sending, by the network device, second indication information to the terminal device includes: sending, by the network device, the second indication information to the terminal device by using the system message, the radio resource control signaling, or the physical control channel.

According to a second aspect, a data transmission method is provided, including: determining, by a terminal device, a type of a response message for uplink data, where the type of the response message for the uplink data is a first response type or a second response type, the first response type is that each time the terminal device sends the uplink data, the network device sends the response message for the uplink data to the terminal device once, and the second response type is that after the terminal device sends the uplink data for a plurality of times, the network device sends, to the terminal device once, the response message for the uplink data that is sent for the plurality of times; sending, by the terminal device, the uplink data to the network device based on a grant-free manner; and receiving, by the terminal device according to the type of the response message for the uplink data, the response message sent by the network device for the uplink data.

In some implementations, before the determining, by a terminal device, a type of a response message for uplink data, the method further includes: receiving, by the terminal device, first indication information sent by the network device, where the first indication information is used to indicate that the first response type corresponds to a first transmission resource, and the second response type corresponds to a second transmission resource, where the first transmission resource is different from the second transmission resource; and determining, by the terminal device according to the type of the response message for the uplink data, a transmission resource used for sending the uplink data.

In some implementations, the determining, by the terminal device according to the type of the response message for the uplink data, a transmission resource used for sending the uplink data includes: if the type of the response message for the uplink data is the first response type, determining, by the terminal device, that the transmission resource used for sending the uplink data is the first transmission resource; or if the type of the response message for the uplink data is the second response type, determining, by the terminal device, that the transmission resource used for sending the uplink data is the second transmission resource.

In some implementations, the first transmission resource and the first transmission resource are transmission resources in time domain and/or frequency domain; or the first transmission resource and the second transmission resource are demodulation reference signal resources.

In some implementations, the receiving, by the terminal device, first indication information sent by the network device to the terminal device includes: receiving, by the terminal device, the first indication information sent by the network device to the terminal device by using a system message, radio resource control signaling, or a physical control channel.

In some implementations, before the determining, by a terminal device, a type of a response message for uplink data, the method further includes: receiving, by the terminal device, second indication information sent by the network device; and the determining, by a terminal device, a type of a response message for uplink data includes: determining, by the terminal device, the type of the response message for the uplink data according to the second indication information.

In some implementations, the second indication information is used to indicate that the type of the response message for the uplink data is the first response type or the second response type.

In some implementations, the second indication information is used to indicate a response criterion used by the terminal device to determine the type of the response message for the uplink data.

In some implementations, the response criterion is that the type of the response message for the uplink data is the type of the response message sent for the uplink data by the network device when using a grant-based manner with the terminal device for the last time.

In some implementations, the receiving, by the terminal device, second indication information sent by the network device includes: receiving, by the terminal device, the second indication information that is sent by the network device by using the system message, the radio resource control signaling, or the physical control channel.

According to a third aspect, a data transmission method is provided, including: receiving, by the first device (which, for example, may be a network device), uplink data that is sent by the second device (which, for example, may be a terminal device) and that is based on grant-free transmission, where the first device responds to the second device by using a response type in a first response type and a second response type, the first response type is that the first device responds to each of a plurality of uplink data transmissions of uplink data sent by the second device, and the second response type is that the first device responds to all of a plurality of transmissions of uplink data sent by the second device.

In some implementations, before the first device and the second device perform the grant-free transmission, the first device sends a first message to the second device, where the first message is at least used by the second device to determine a response type used in a response message replied by the first device to the uplink data that is sent by the second device and that is based on the grant-free transmission.

In some implementations, the first message carries first indication information, where the first indication information is used to indicate various response types that are supported when the first device and the second device perform the grant-free transmission, and grant-free transmission resources corresponding to the various response types, and the various response types include the first response type and the second response type.

In some implementations, the first message carries second indication information, where the second indication information is used to indicate, to the second device, a response type used when the first device sends a response to the second device after the first device receives the uplink data that is sent by the second device and that is based on the grant-free transmission.

In some implementations, the first message carries third indication information (which may also be referred to as the foregoing second indication information), where the third indication information is used to indicate, to the second device, a response criterion corresponding to a response type used by the first device to send, to the second device, the response message for the uplink data that is based on the grant-free transmission.

In some implementations, the response criterion is that when the first device and the second device perform grant-free transmission, a response type used by the first device to send the response to the second device is the same as a response type used in the grant-based transmission performed by the first device and the second device for the last time.

In some implementations, the grant-free transmission resources used for the first response type and the second response type include grant-free transmission resources in time domain and/or frequency domain.

In some implementations, the grant-free transmission resources used for the first response type and the second response type include DMRS resources. The DMRS set included in the grant-free transmission resource used for the first response type is different from the DMRS set included in the grant-free transmission resource used for the second response type.

In some implementations, in the second response type, incremental redundancy versions of all of a plurality of transmissions of uplink data that is sent by the second device to the first device and that is received by the first device are different.

In some implementations, the first device sends the first message to the second device by using a system message.

In some implementations, the first device sends the first message to the second device by using RRC signaling.

In some implementations, the first device sends the first message to the second device by using a physical control channel.

According to a fourth aspect, a data transmission method is provided, and the method includes: when a first device (which, for example, may be a network device) and a second device (which, for example, may be a terminal device) perform grant-free transmission, sending, by the second device, uplink data to the first device, and receiving, by the second device, a response for the uplink data, where the response is sent by the first device by using a response type in the first response type and the second response type, the first response type is that the second device receives a response for each of a plurality of uplink data transmissions of uplink data sent by the second device, and the second response type is that the second device receives a response for all of a plurality of transmissions of uplink data sent by the second device.

In some implementations, before the first device and the second device perform the grant-free transmission, the second device receives a first message sent by the first device, where the first message is at least used by the second device to determine a response type used in a response message replied by the first device to the uplink data that is sent by the second device and that is based on the grant-free transmission.

In some implementations, the first message carries first indication information, where the first indication information is used to indicate various response types that are supported when the first device and the second device perform the grant-free transmission, and grant-free transmission resources corresponding to the various response types, and the various response types include the first response type and the second response type.

In some implementations, the first message carries second indication information, where the second indication information is used to indicate, to the second device, a response type used when the second device receives a response sent by the first device to the second device after the second device sends, to the first device, the uplink data that is based on the grant-free transmission.

In some implementations, the first message carries third indication information (which may also be referred to as the foregoing second indication information), where the third indication information is used to indicate, to the second device, a response criterion corresponding to a response type used by the second device to receive the response message sent, to the second device, by the first device for the uplink data that is based on the grant-free transmission.

In some implementations, the response criterion is that when the first device and the second device perform grant-free transmission, a response type of a response that is sent by the first device to the second device and that is received by the second device is the same as a response type used in the grant-based transmission performed by the first device and the second device for the last time.

In some implementations, the grant-free transmission resources used for the first response type and the second response type include grant-free transmission resources in time domain and/or frequency domain.

In some implementations, the grant-free transmission resources used for the first response type and the second response type include DMRS resources. The DMRS set included in the grant-free transmission resource used for the first response type is different from the DMRS set included in the grant-free transmission resource used for the second response type.

In some implementations, in the second response type, incremental redundancy versions of all of a plurality of transmissions of uplink data that is sent by the second device to the first device are different.

In some implementations, the second device receives the first message that is sent by the first device to the second device by using a system message.

In some implementations, the second device receives the first message that is sent by the first device to the second device by using RRC signaling.

In some implementations, the second device receives the first message that is sent by the first device to the second device by using a physical control channel.

According to a fifth aspect, a data transmission apparatus is provided, and is configured to perform the method according to the first aspect or any one of the possible implementations of the first aspect. Specifically, the apparatus includes units configured to perform the method according to the first aspect or any one of the possible implementations of the first aspect.

According to a sixth aspect, a data transmission apparatus is provided, and is configured to perform the method according to the second aspect or any one of the possible implementations of the second aspect. Specifically, the apparatus includes units configured to perform the method according to the second aspect or any one of the possible implementations of the second aspect.

According to a seventh aspect, a data transmission apparatus is provided, and is configured to perform the method according to the third aspect or any one of the possible implementations of the third aspect. Specifically, the apparatus includes units configured to perform the method according to the third aspect or any one of the possible implementations of the third aspect.

According to an eighth aspect, a data transmission apparatus is provided, and is configured to perform the method according to the fourth aspect or any one of the possible implementations of the fourth aspect. Specifically, the apparatus includes units configured to perform the method according to the fourth aspect or any one of the possible implementations of the fourth aspect.

According to a ninth aspect, a data transmission apparatus is provided, where the apparatus includes a transceiver (which may include a transmitter and a receiver), a memory, and a processor. The transceiver, the memory, and the processor communicate with each other by using an internal connection path. The memory is configured to store an instruction. The processor is configured to execute the instruction stored in the memory, to control the receiver to receive a signal and control the transmitter to send a signal, so as to enable the apparatus to perform the method according to the first aspect or any one of the possible implementations of the first aspect.

According to a tenth aspect, a data transmission apparatus is provided, where the apparatus includes a transceiver (which may include a transmitter and a receiver), a memory, and a processor. The transceiver, the memory, and the processor communicate with each other by using an internal connection path. The memory is configured to store an instruction. The processor is configured to execute the instruction stored in the memory, to control the receiver to receive a signal and control the transmitter to send a signal, so as to enable the apparatus to perform the method according to the second aspect or any one of the possible implementations of the second aspect.

According to an eleventh aspect, a data transmission apparatus is provided, where the apparatus includes a transceiver (which may include a transmitter and a receiver), a memory, and a processor. The transceiver, the memory, and the processor communicate with each other by using an internal connection path. The memory is configured to store an instruction. The processor is configured to execute the instruction stored in the memory, to control the receiver to receive a signal and control the transmitter to send a signal, so as to enable the apparatus to perform the method according to the third aspect or any one of the possible implementations of the third aspect.

According to a twelfth aspect, a data transmission apparatus is provided, where the apparatus includes a transceiver (which may include a transmitter and a receiver), a memory, and a processor. The transceiver, the memory, and the processor communicate with each other by using an internal connection path. The memory is configured to store an instruction. The processor is configured to execute the instruction stored in the memory, to control the receiver to receive a signal and control the transmitter to send a signal, so as to enable the apparatus to perform the method according to the fourth aspect or any one of the possible implementations of the fourth aspect.

According to a thirteenth aspect, a data transmission system is provided, including the apparatus according to the fifth aspect or any one of optional implementations of the fifth aspect and the apparatus according to the sixth aspect or any one of optional implementations of the sixth aspect. Optionally, the system includes the apparatus according to the ninth aspect or any one of optional implementations of the ninth aspect and the apparatus according to the tenth aspect or any one of optional implementations of the tenth aspect.

According to a fourteenth aspect, a data transmission system is provided, including the apparatus according to the seventh aspect or any one of optional implementations of the seventh aspect and the apparatus according to the eighth aspect or any one of optional implementations of the eighth aspect. Optionally, the system includes the apparatus according to the eleventh aspect or any one of optional implementations of the eleventh aspect and the apparatus according to the twelfth aspect or any one of optional implementations of the twelfth aspect.

According to a fifteenth aspect, a computer readable storage medium is provided, where the computer readable storage medium stores an instruction, and when the instruction is run on a computer, the computer is enabled to perform the method according to the first aspect or any one of the possible implementations of the first aspect.

According to a sixteenth aspect, a computer readable storage medium is provided, where the computer readable storage medium stores an instruction, and when the instruction is run on a computer, the computer is enabled to perform the method according to the second aspect or any one of the possible implementations of the second aspect.

According to a seventeenth aspect, a computer readable storage medium is provided, where the computer readable storage medium stores an instruction, and when the instruction is run on a computer, the computer is enabled to perform the method according to the third aspect or any one of the possible implementations of the third aspect.

According to an eighteenth aspect, a computer readable storage medium is provided, where the computer readable storage medium stores an instruction, and when the instruction is run on a computer, the computer is enabled to perform the method according to the fourth aspect or any one of the possible implementations of the fourth aspect.

According to a nineteenth aspect, this application provides a computer program product that includes an instruction, where when the computer program product is run on a computer, the computer is enabled to perform the method according to the first aspect or any one of the possible implementations of the first aspect.

According to a twentieth aspect, this application provides a computer program product that includes an instruction, where when the computer program product is run on a computer, the computer is enabled to perform the method according to the second aspect or any one of the possible implementations of the second aspect.

According to a twenty-first aspect, this application provides a computer program product that includes an instruction, where when the computer program product is run on a computer, the computer is enabled to perform the method according to the third aspect or any one of the possible implementations of the third aspect.

According to a twenty-second aspect, this application provides a computer program product that includes an instruction, where when the computer program product is run on a computer, the computer is enabled to perform the method according to the fourth aspect or any one of the possible implementations of the fourth aspect.

According to a twenty-third aspect, this application provides a communications chip, storing an instruction, where when the instruction is run on a network device or a terminal device, the network device or the terminal device is enabled to perform any one of the methods according to the foregoing aspects.

DESCRIPTION OF EMBODIMENTS

It should be understood that the technical solutions of embodiments of this application may be applied to various communications systems, such as a global system for mobile communications (global system of mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communications system, a wireless local area network (wireless local area network, WLAN), or a future fifth generation (the fifth Generation, 5G) wireless communications system.

Figure 1:
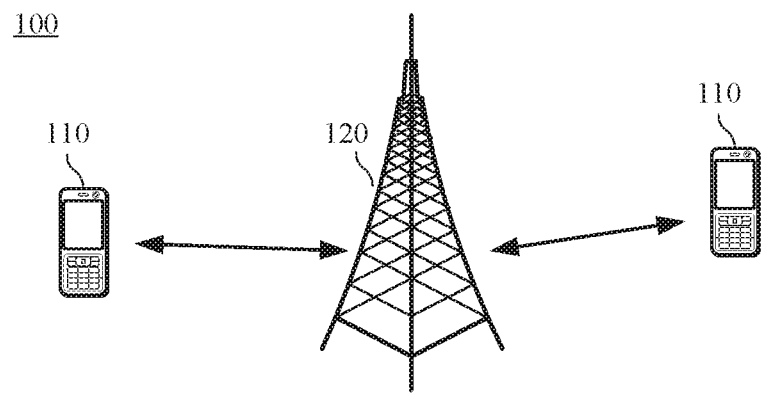
FIG. 1 shows a communications system to which an embodiment of this application is applied.

FIG. 1 shows a communications system 100 to which an embodiment of this application is applied. The communications system 100 may include a terminal device 110 and a network device 120. In this embodiment of this application, the terminal device 110 may refer to user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in this embodiment of this application.

The network device 120 in this embodiment of this application may be a device configured to communicate with the terminal device 110. The network device may be a base transceiver station (base transceiver station, BTS) in GSM or CDMA, or a NodeB (NodeB, NB) in a WCDMA system, or an evolved NodeB (evolutional NodeB, eNB or eNodeB) in an LTE system, or a radio controller in a cloud radio access network (cloud radio access network, CRAN) scenario. Alternatively, the network device may be a relay node, an access point, a vehicle-mounted device, a wearable device, a network device in a future 5G network, a network device in a future evolved PLMN network, or the like. This is not limited in this embodiment of this application.

It should be understood that there may be one or more terminal devices 110. In this embodiment of this application, only one terminal device is used as an example for description.

The terminal device may send data in two manners; a grant-free manner and a grant-based (which may be referred to as grant-based or with grant) manner. The grant-free manner may also be referred to as a grant-free manner. In the grant-based manner, when the terminal device 110 sends the uplink data to the network device 120, the terminal device 110 sends a scheduling request (scheduling request. SR) message to the network device 120, where the scheduling request message is used to request the network device 120 that the uplink data needs to be transmitted by the terminal device 110; and the network device 120 configures, for the terminal device 110 according to the scheduling request message sent by the terminal device 110, a transmission resource used for sending the uplink data. In this way, a process of requesting before configuration is needed, resulting in relatively high signaling overheads and a relatively high latency. For example, in a future network system, an ultra-reliable and low latency communication (ultra-reliable and low latency communication, URLLC) has a relatively high requirement for latency, and if transmission is performed in the grant-based manner, a requirement for a low latency cannot be met. Therefore, the grant-free manner is proposed for a future network system. In the grant-free manner, a specific grant-free transmission resource is preconfigured by the network device 120, and when the terminal device 110 needs to send uplink data to the network device 120, the terminal device 110 sends the uplink data to the network device 120 on the grant-free transmission resource. This reduces signaling overheads and reduces a transmission latency.

To improve reliability of data transmission, the terminal device may send the uplink data for a plurality of times. When the terminal device receives an ACK response message sent by the network device, the terminal device may stop sending the uplink data. When the terminal device does not receive any response message sent by the network device in a specific time window or receives an NACK response message, the terminal device continues to send the uplink data. In the grant-based transmission manner, the network device may perform uplink scheduling; and the terminal device determines, according to an uplink scheduling indication, how the network device sends a response message for uplink data, and correspondingly receives the response message for the uplink data according to the uplink scheduling indication. How the network device sends a response message to the terminal device in grant-free transmission is a problem that needs to be urgently resolved. To resolve this problem, an embodiment of this application provides a data transmission method, and the network device may send the response message to the terminal device according to a type of the response message.

The following describes a schematic diagram of a data transmission method according to an embodiment of this application with reference to accompanying drawings.

Figure 2:
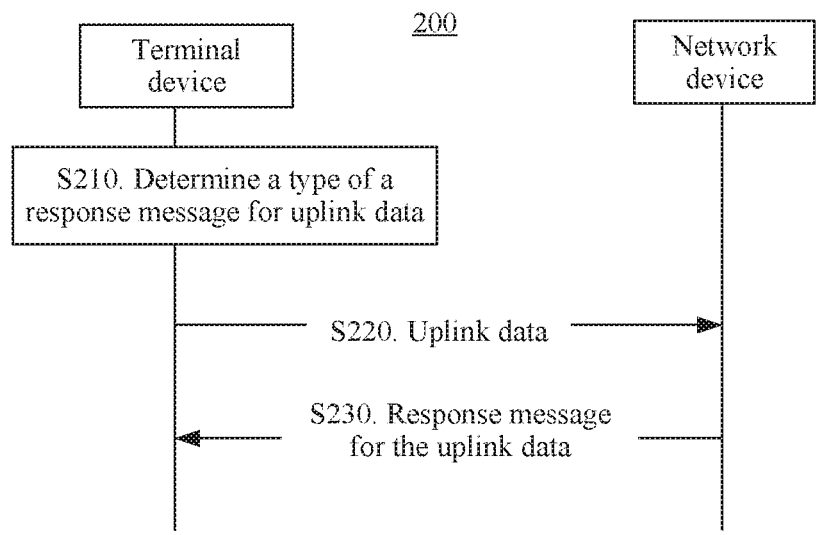
FIG. 2 is a schematic diagram of a data transmission method according to an embodiment of this application.

FIG. 2 shows a data transmission method 200 according to an embodiment of this application. The method 200 includes the following steps.

S210. A terminal device determines a type of a response message for uplink data, where the type of the response message for the uplink data is a first response type or a second response type, the first response type is that each time the terminal device sends the uplink data, the network device sends the response message for the uplink data to the terminal device once, and the second response type is that after the terminal device sends the uplink data for a plurality of times, the network device sends, to the terminal device once, the response message for the uplink data that is sent for the plurality of times.

It should be understood that the uplink data that is sent for the plurality of times may be retransmitted uplink data (that is, retransmission. K-repetition). For example, the uplink data that is sent for the plurality of times may be uplink data repeatedly sent for K times (K is a positive integer). Herein, the uplink data repeatedly sent for K times may be completely the same (for example, redundancy version numbers are completely the same), completely different (for example, the redundancy version numbers are completely different), or partially the same and partially different (for example, redundancy version numbers of some data are the same, and the redundancy version numbers of some data are different). The response message herein is a response message that the network device needs to send to the terminal device after the terminal device sends the uplink data to the network device for the plurality of times, to determine whether the network device successfully receives the uplink data sent that is sent by the terminal device for the plurality of times.

Figure 3:
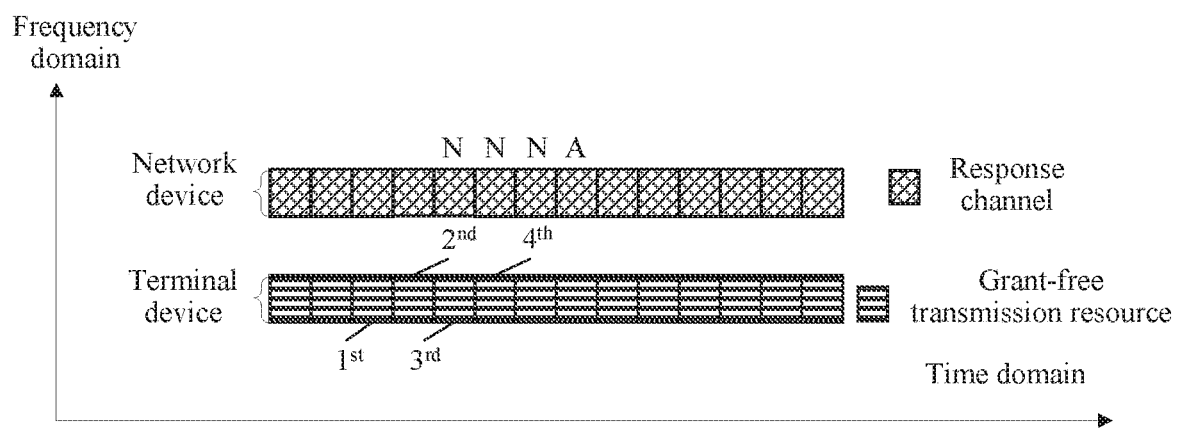
FIG. 3 is a schematic diagram of a first response type according to an embodiment of this application.
Figure 4:
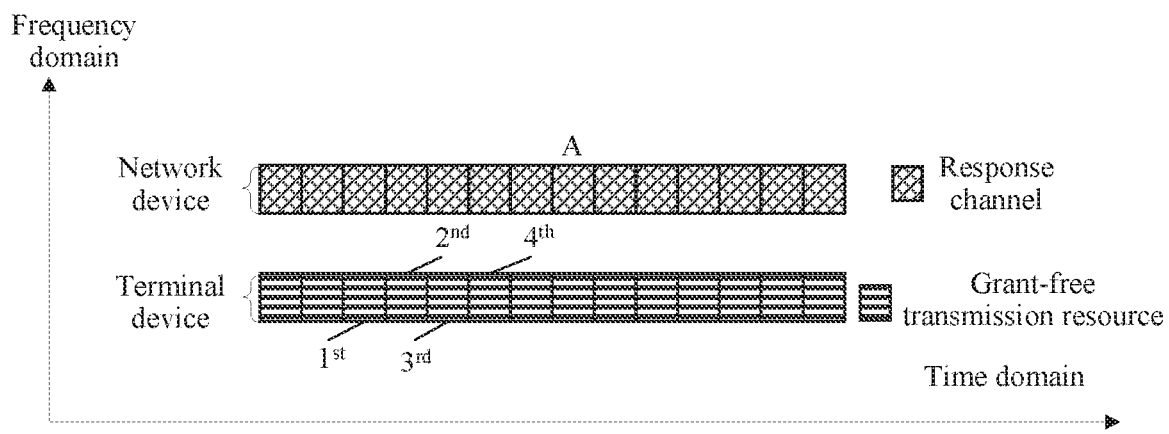
FIG. 4 is a schematic diagram of a second response type according to an embodiment of this application.

The first response type may be that each time the terminal device sends the uplink data, the network device feeds back the response message to the terminal device once. In the first response type, when receiving the uplink data once, the network device may reply an ACK, to confirm that the uplink data is successfully received, or optionally, to terminate a retransmission that has not been performed subsequently, to reduce signaling overheads. For example, as shown in FIG. 3, the terminal device separately sends the uplink data for four times on a grant-free transmission resource, and the network device separately sends response messages, on corresponding response channels for four times, for the uplink data that is sent for four times. The second response type may be that the terminal device sends the uplink data for a plurality of times, and the network device feeds back a response message to the terminal device once. Uplink data that is sent for the plurality of times may be uplink data that is sent for N times, where N is an integer greater than or equal to 2. In the second response type, the network device may respond to all of the plurality of retransmissions of the uplink data sent by the terminal device, to obtain a combined demodulation gain. For example, as shown in FIG. 4, a terminal device separately sends uplink data on a grant-free transmission resource for four times, and a network device sends a response message on a corresponding response channel once, where the response message is a response message for the four transmissions of the uplink data. In FIG. 3 and FIG. 4, A represents a positive acknowledgement (ACK), N represents a negative acknowledgement (NACK), and $1^{st}$, $2^{nd}$, $3^{rd}$, and $4^{th}$ represent the four transmissions of the uplink data.

Optionally, the uplink data that is sent for the plurality of times may be retransmitted by using a hybrid automatic repeat request (hybrid automatic repeat request, HARQ) mechanism, to improve a diversity gain and reduce a quantity of retransmissions, thereby reducing a latency. When the network device cannot demodulate data (incorrect data) successfully but can identify a transmit end (for example, a terminal device) of the data, the network device does not simply discard the data, but responds to the terminal device with a negative acknowledgment (negative acknowledge, NACK) message. The terminal device receives the NACK and then retransmits the data. The network device combines the original incorrect data (for example, initially transmitted data) with newly received retransmitted bit information, and then performs demodulation again. Further, in LTE, a HARQ mechanism uses an incremental redundancy (incremental redundancy) solution, that is, bit information of each retransmission does not need to be the same as the initially transmitted data. Instead, a wireless communications device may generate a plurality of encoded bit sets, and when a retransmission is required, an encoded bit set different from an encoded bit set used for a previous time is usually transmitted. The network device combines the retransmitted bit information (for example, retransmitted data) with data transmitted for the previous time, and then performs demodulation. Herein, an encoded bit set for each retransmission is referred to as a redundancy version (redundancy version, RV). For example, there may be four redundancy versions in LTE: RV0 to RV3. RV0 may correspond to an encoded bit set of the initially transmitted data; RV2 may correspond to an encoded bit set of the $1^{st}$ retransmission data ($1^{st}$ re-transmission); RV3 may correspond to an encoded bit set of the $2^{nd}$ retransmission data ($2^{nd}$ re-transmission); and RV1 may correspond to an encoded bit set of the $3^{rd}$ retransmission data ($3^{rd}$ re-transmission). In this embodiment of this application, RVs in all of the plurality of uplink data transmissions may be different, and a combined demodulation gain may be obtained. Optionally, RVs in all of the plurality of uplink data transmissions may be the same. Optionally, RVs of some uplink data in the uplink data that is sent for the plurality of times may be the same, and RVs of some uplink data may be different. This is not limited in this embodiment of this application.

Specifically, in S210, the terminal device determines the type of the response message for the uplink data in three manners. The following describes the three manners.

In a first manner, the terminal device expects the network device to use a specific response type to send the response message for the uplink data to the terminal device, and then the terminal device selects the specific response type of the response message for the uplink data. In this manner, the terminal device may flexibly select a response message expected to be received, thereby improving flexibility of receiving response information by the terminal device.

In a second manner, the network device sends second indication information to the terminal device, and the terminal device receives the second indication information sent by the network device. The second indication information is used by the terminal device to determine a response type of the response message for the uplink data. Specifically, the second indication information indicates that the response type of the response message for the uplink data of the terminal device is the first response type or the second response type. If the second indication information indicates that the response type of the response message for the uplink data of the terminal device is the first response type, the terminal device determines that the response type of the response message for the uplink data is the first response type, that is, each time the terminal device sends the uplink data, the terminal device may receive the response message once. If the second indication information indicates that the response type of the response message for the uplink data of the terminal device is the second response type, the terminal device determines that the response type of the response message for the uplink data is the second response type, that is, the terminal device sends the uplink data for a plurality of times, and the terminal device then receives the response message once. In this manner, when receiving the uplink data, the network device directly sends the response message according to the type of the response message indicated by the second indication information.

In a third manner, the second indication information may alternatively indicate a response criterion used by the terminal device to determine the type of the response message for the uplink data. The terminal device determines the type of the response message for the uplink data according to the response criterion indicated by the second indication information. For example, the response criterion may be that the type of the response message for the uplink data is the type of the response message sent for the uplink data by the network device when using the grant-based manner with the terminal device for the last time, and the type of the response message sent for the uplink data when the grant-based manner is used for the last time is the type of the response message indicated by uplink scheduling information when the grant-based manner is used for the last time. If the type of the response message sent for the uplink data by the network device when using the grant-based manner with the terminal device for the last time is the first response type, the type of the response message for the uplink data sent by the terminal device this time is the first response type; or if the type of the response message sent for the uplink data by the network device when using the grant-based manner with the terminal device for the last time is the second response type, the type of the response message for the uplink data sent by the terminal device this time is the second response type. For another example, the response criterion may be that the type of the response message for the uplink data is the type of the response message sent for the uplink data by the network device when using the grant-based manner with the terminal device for the penultimate time. In this embodiment of this application, the response criterion is not specifically limited.

Optionally, that the network device sends second indication information to the terminal device includes: sending, by the network device, the second indication information to the terminal device by using a system message or radio resource control (radio resource control. RRC) signaling or a physical control channel; and that the terminal device receives the second indication information sent by the network device includes: receiving, by the terminal device, the second indication information that is sent by the network device by using the system message, the radio resource control signaling, or the physical control channel. When the network device sends the second indication information by using system information or RRC signaling, it may be considered as a static or semi-static configuration, and signaling overheads may be reduced. When the network device sends the second indication information by using the physical control channel, it may be considered as a dynamical configuration, and configuration real-timeliness can be enhanced.

S220. The terminal device sends the uplink data to the network device based on a grant-free manner, and the network device receives the uplink data that is sent by the terminal device based on the grant-free manner.

In an optional embodiment, before S210, the method further includes: sending, by the network device, first indication information to the terminal device, and receiving, by the terminal device, the first indication information sent by the network device, where the first indication information is used to indicate that the first response type corresponds to a first transmission resource, and the second response type corresponds to a second transmission resource, where the first transmission resource is different from the second transmission resource. The terminal device may determine, according to the type of the response message for the uplink data determined in S210, the transmission resource used for sending the uplink data; and the network device determines, based on a transmission resource for the received uplink data, the type of the response message to be sent, to the terminal device, for the uplink data. For example, if the type of the response message for the uplink data determined by the terminal device in S210 is the first response type, the terminal device determines that the transmission resource used for sending the uplink data is the first transmission resource, and the terminal device sends the uplink data on the first transmission resource: or if the type of the response message for the uplink data determined by the terminal device in S210 is the second response type, the terminal device determines that the transmission resource used for sending the uplink data is the second transmission resource, and the terminal device sends the uplink data on the second transmission resource. If the network device receives the uplink data on the first transmission resource, the network device determines that the type of the response message for the uplink data is the first response type, that is, each time the network device receives the uplink data, the network device sends the response message to the terminal device once. If the network device receives the uplink data on the second transmission resource, the network device determines that the type of the response message for the uplink data is the second response type, that is, the network device receives uplink data that is sent for a plurality of times, and then sends the response message to the terminal device once. Further, the first transmission resource and the second transmission resource may be transmission resources in time domain and/or frequency domain, for example, may be a grant-free transmission resource in time domain and/or frequency domain. Optionally, the first transmission resource and the second transmission resource may alternatively be demodulation reference signal (demodulation reference signal, DMRS) resources, that is, different DMRSs correspond to different types of the response messages of the uplink data.

It should be understood that the first transmission resource and the second transmission resource may alternatively be code domain resources, or the like. This is not limited in this embodiment of this application.

Optionally, that the network device sends first indication information to the terminal device includes: sending, by the network device, the first indication information to the terminal device by using a system message, RRC signaling, or a physical control channel; and that the terminal device receives the first indication information sent by the network device includes: receiving, by the terminal device, the first indication information that is sent by the network device by using the system message, the radio resource control signaling, or the physical control channel. When the network device sends the first indication information by using the system information or RRC signaling, it may be considered as a static or semi-static configuration, and signaling overheads may be reduced. When the network device sends the first indication information by using the physical control channel, it may be considered as a dynamical configuration, and configuration real-timeliness can be enhanced.

S230. The network device sends the response message for the uplink data to the terminal device according to the type of the response message for the uplink data, and the terminal device receives, according to the type of the response message for the uplink data, the response message sent by the network device for the uplink data.

Specifically, in a first manner of S210, if the terminal device determines that the type of the response message for the uplink data is the first response type, the terminal device sends the uplink data on the first transmission resource, and when the network device receives the uplink data on the first transmission resource, the network device sends the response message for the uplink data to the terminal device by using the first response type. If the terminal device determines that the type of the response message for the uplink data is the second response type, the terminal device sends the uplink data on the second transmission resource, and when the network device receives the uplink data on the second transmission resource, the network device sends the response message for the uplink data to the terminal device by using the second response type.

Therefore, according to the data transmission method provided in this embodiment of this application, the network device may send the response message to the terminal device according to the type of the response message for the uplink data. For example, when the type of the response message for the uplink data is the first response type, each time the terminal device sends the uplink data, the network device sends the response message to the terminal device once. For another example, when the type of the response message for the uplink data is the second response type, the terminal device sends the uplink data for a plurality of times, and the network device sends the response message to the terminal device once. In addition, the network device sends the response message to the terminal device according to the type of the response message for the uplink data, and the terminal device receives the response message according to the type of the response message. For example, the network device determines, according to a response type of a response, a resource location at which the response message is sent, the network device sends the response message at a corresponding resource location, and the terminal device receives the response message at the corresponding resource location, to improve transmission accuracy of the response message. In addition, the terminal device determines, according to the response message, whether the uplink data is accurately received. If the response message received by the terminal device is an ACK, it indicates that the uplink data is correctly received, and the terminal device does not need to retransmit the uplink data; or if the response message received by the terminal device is an NACK, it indicates that the uplink data is not correctly received, and the terminal device may need to retransmit the uplink data.

The following describes in detail the data transmission method in this application with reference to the accompanying drawings.

Figure 5:
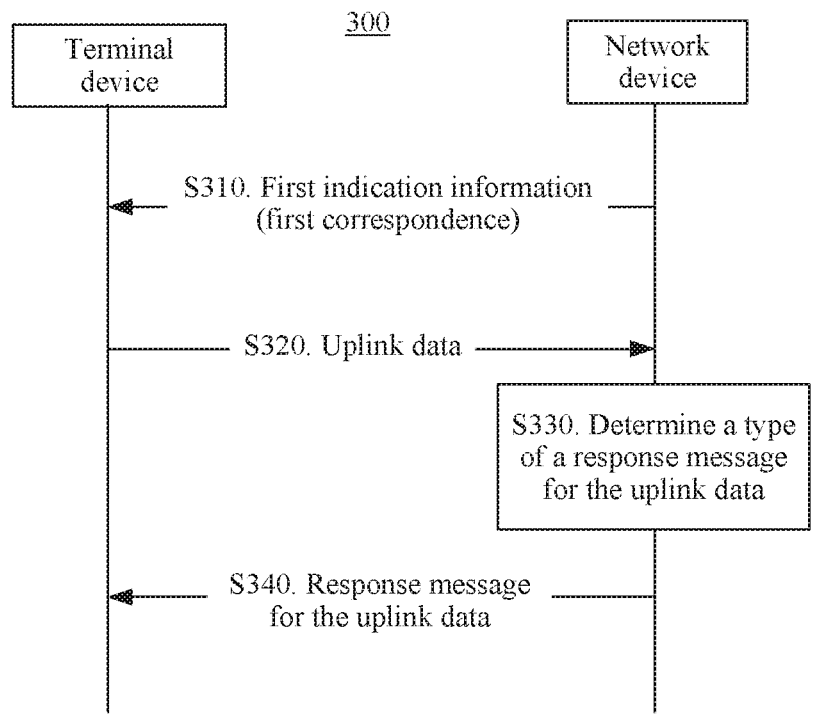
FIG. 5 is a schematic diagram of another data transmission method according to an embodiment of this application.

FIG. 5 shows a data transmission method 300 according to an embodiment of this application. The method 300 includes the following steps.

S310. A network device sends first indication information to a terminal device, where the first indication information is used to indicate a first correspondence between a transmission resource and a response type. The first correspondence may be that the first transmission resource corresponds to a first response type, and a second transmission resource corresponds to a second response type. For example, the terminal device stores a resource index 1 of the first transmission resource, a resource index 2 of the second transmission resource, a type index 1 of the first response type, and a type index 2 of the second response type, and the first indication information may indicate that the resource index 1 corresponds to the type index 1, and the resource index 2 corresponds to the type index 2. For another example, the first indication information may alternatively indicate a response type (which, for example, may be the first response type or the second response type) that may be supported in a grant-free transmission performed by the network device and the terminal device, a transmission resource corresponding to the response type, or the like. Specifically, the network device may send the first indication information to the terminal device by using semi-static signaling or dynamic signaling; and the terminal device receives the first indication information that is sent by the network device by using the semi-static signaling or the dynamic signaling. For example, the semi-static signaling may be a master information block (master information block, MIB), a system information block (system information block, SIB), or RRC signaling, and the dynamic signaling may be a physical control channel, or the like.

Figure 6:
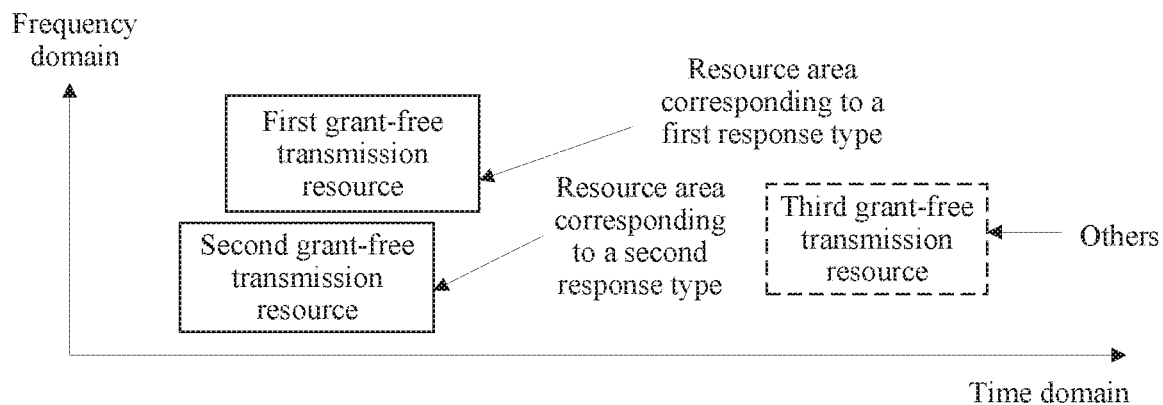
FIG. 6 is a schematic diagram of a correspondence between a transmission resource and a response type according to an embodiment of this application.
Figure 7:
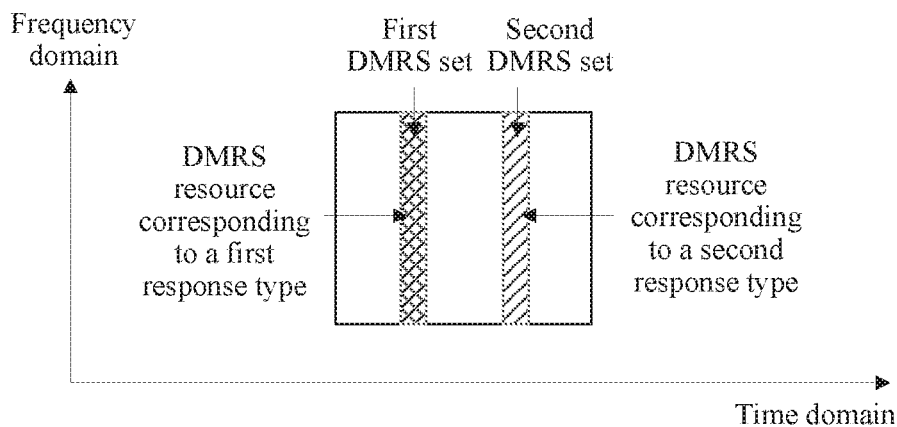
FIG. 7 is a schematic diagram of a correspondence between another transmission resource and a response type according to an embodiment of this application.

For example, as shown in FIG. 6, the first indication information may indicate that a resource area corresponding to the first response type is a first grant-free transmission resource, and a resource area corresponding to the second response type is a second grant-free transmission resource. Optionally, the network device may further divide a grant-free transmission area to obtain a third grant-free transmission resource, and the third grant-free transmission resource may be used for another purpose. For another example, as shown in FIG. 7, the first indication information may indicate that a DMRS resource corresponding to the first response type is a first DMRS set, and a DMRS resource corresponding to the second response type is a second DMRS set, where DMRSs in the first DMRS set are different from DMRSs in the second DMRS set.

S320. The terminal device may send uplink data to the network device on a grant-free transmission resource bounded with a type expected to be used by the network device to send a response message. The network device receives the uplink data sent by the terminal device. Specifically, if the terminal device expects the network device to respond by using the first response type, the terminal device sends the uplink data in the resource area corresponding to the first response type; or if the terminal device expects the network device to respond by using the second response type, the terminal device sends the uplink data in the resource area corresponding to the second response type. The uplink data may be uplink data retransmitted for a plurality of times. For example, in FIG. 6, if the terminal device expects the network device to respond by using the first response type, the terminal device sends the uplink data on the first grant-free transmission resource; or if the terminal device expects the network device to respond by using the second response type, the terminal device sends the uplink data on the second grant-free transmission resource. For another example, in FIG. 7, if the terminal device expects the network device to respond by using the first response type, the terminal device sends the DMRSs in the first DMRS set; or if the terminal device expects the network device to respond by using the second response type, the terminal device sends the DMRSs in the second DMRS set.

S330. The network device determines a type of the response message for the uplink data according to the first indication information and a transmission resource used by the received uplink data. Specifically, if the network device receives, on the first transmission resource, the uplink data sent by the terminal device, the network device determines to send the response message for the uplink data to the terminal device by using the first response type: or if the network device receives, on the second transmission resource, the uplink data sent by the terminal device, the network device determines to send the response message for the uplink data to the terminal device by using the second response type. For example, in FIG. 6, if the network device receives the uplink data on the first grant-free transmission resource, the network device determines to send the response message for the uplink data to the terminal device by using the first response type, that is, each time the uplink data is sent, the network device sends the response message once; or if the network device receives the uplink data on the second grant-free transmission resource, the network device determines to send the response message for the uplink data to the terminal device by using the second response type, that is, the network device sends a response message for all of a plurality of retransmissions of the uplink data. For another example, in FIG. 7, if DMRSs received by the network device belong to the first DMRS set, the network device determines to send a response message for the uplink data to the terminal device by using the first response type, that is, each time the uplink data is sent, the network device sends the response message once; or if the DMRSs received by the network device belong to the second DMRS set, the network device determines to send a response message for the uplink data to the terminal device by using the second response type, that is, the network device sends the response message for all of a plurality of retransmissions of the uplink data.

S340. The network device sends the response message for the uplink data to the terminal device according to the type of the response message for the uplink data determined in S330, and the terminal device receives the response message for the uplink data by using an expected response type.

Figure 8:
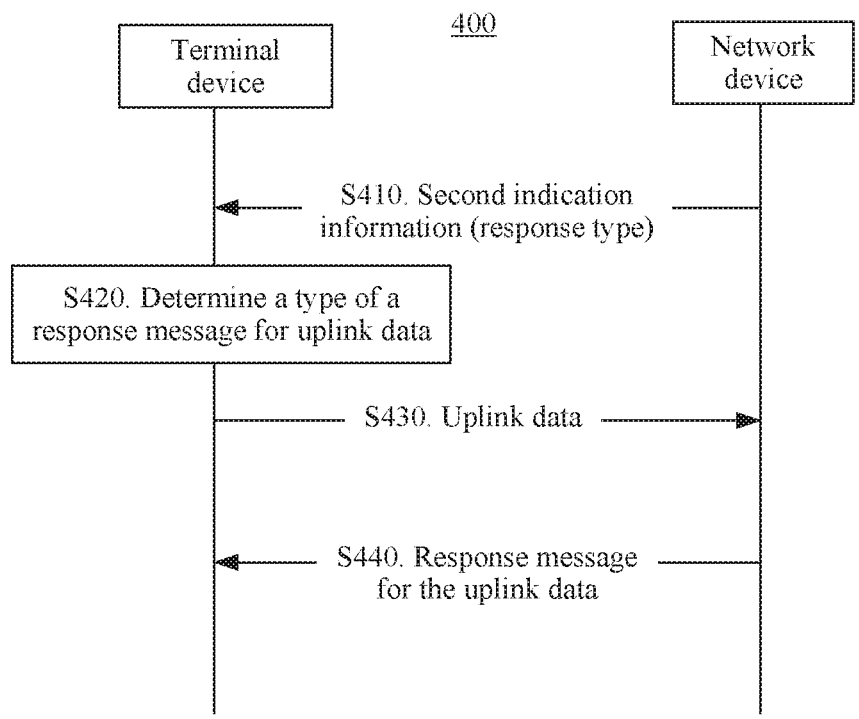
FIG. 8 is a schematic diagram of still another data transmission method according to an embodiment of this application.

FIG. 8 shows a data transmission method 400 according to an embodiment of this application. The method 400 includes the following steps.

S410. A network device sends the second indication information to a terminal device, and the terminal device receives the second indication information sent by the network device, where the second indication information is used to indicate that a type of a response message for the uplink data is the first response type or the second response type. Specifically, the network device may send the second indication information to the terminal device by using semi-static signaling or dynamic signaling, and the terminal device receives the second indication information that is sent by the network device by using the semi-static signaling or the dynamic signaling. For example, the semi-static signaling may be an MIB, an SIB, or RRC signaling, and the dynamic signaling may be a physical control channel, or the like.

S420. The terminal device determines the type of the response message for the uplink data according to the second indication information. If the second indication information indicates that the type of the response message for the uplink data is the first response type, the terminal device determines that the type of the response message for the uplink data is the first response type; or if the second indication information indicates that the type of the response message for the uplink data is the second response type, the terminal device determines that the type of the response message for the uplink data is the second response type.

S430. The terminal device sends the uplink data to the network device.

S440. The network device sends the response message for the uplink data to the terminal device according to the response type indicated by the second indication information, and the terminal device receives, according to the response type indicated by the second indication information, the response message sent by the network device. Specifically, if the second indication information indicates the first response type, each time the terminal device sends the uplink data, the network device sends the response message for the uplink data once, where, for example, the response message may be an ACK or an NACK; and each time the terminal device sends the uplink data, the terminal device receives the response message once. If the second indication information indicates the second response type, the terminal device sends the uplink data for a plurality of times, and the network device sends the response message once, where, for example, the response message may be the ACK or the NACK; and the terminal device sends the uplink data for a plurality of times and receives the response message once.

Figure 9:
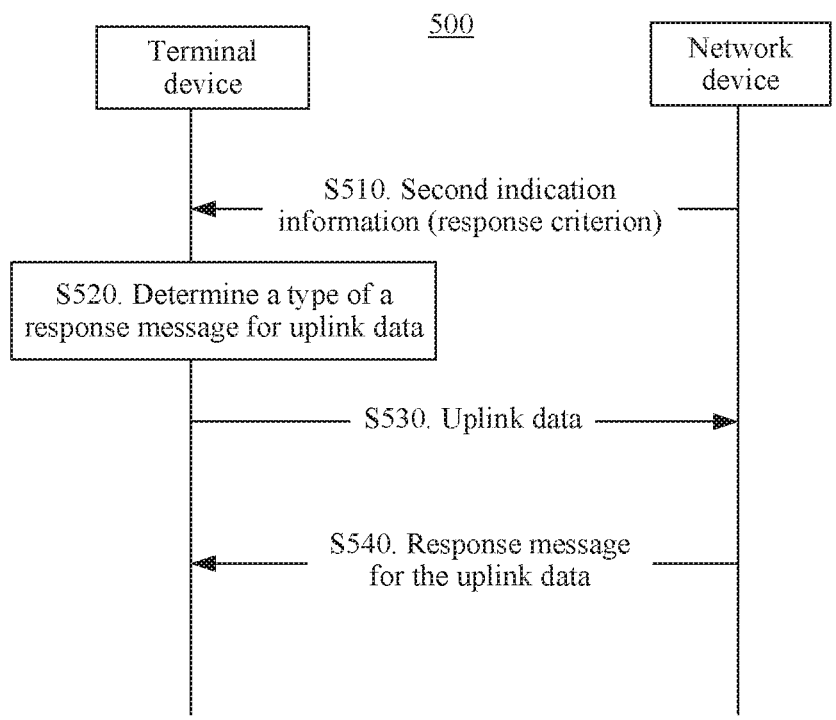
FIG. 9 is a schematic diagram of still another data transmission method according to an embodiment of this application.

FIG. 9 shows a data transmission method 500 according to an embodiment of this application. The method 500 includes the following steps.

S510. A network device sends the second indication information to a terminal device, and the terminal device receives the second indication information sent by the network device, where the second indication information is used to indicate a response criterion used by the terminal device to determine a type of a response message for the uplink data. Specifically, the network device may send the second indication information to the terminal device by using semi-static signaling or dynamic signaling, and the terminal device receives the second indication information that is sent by the network device by using the semi-static signaling or the dynamic signaling. For example, the semi-static signaling may be an MIB, an SIB, or RRC signaling, and the dynamic signaling may be a physical control channel, or the like.

S520. The terminal device determines the type of the response message for the uplink data according to the response criterion indicated by the second indication information. For example, the response criterion may be that the type of the response message for the uplink data is a type of a response message sent for the uplink data by the network device when using a grant-based manner with the terminal device for the last time. If the type of the response message sent for the uplink data by the network device when using the grant-based manner with the terminal device for the last time is the first response type, the terminal device determines that the type of the response message for the uplink data is the first response type; or if the type of the response message sent for the uplink data by the network device when using the grant-based manner with the terminal device for the last time is the second response type, the terminal device determines that the type of the response message for the uplink data is the second response type.

S530. The terminal device sends the uplink data to the network device.

S540. The network device sends the response message for the uplink data to the terminal device according to the response criterion indicated by the second indication information, and the terminal device determines the response message type of the uplink data according to the response criterion indicated by the second indication information. If the type of the response message for the uplink data determined by the terminal device according to the response criterion is the first response type, each time the terminal device sends the uplink data, the network device sends the response message for the uplink data once, where for example, the response message may be an ACK or an NACK and each time the terminal device sends the uplink data, the terminal device receives the response message once. If the type of the response message for the uplink data determined by the terminal device according to the response criterion is the second response type, the terminal device sends the uplink data for a plurality of times, and the network device sends the response message once, where, for example, the response message may be the ACK or the NACK; and the terminal device sends the uplink data for a plurality of times and receives the response message once.

It should be understood that, in the method 300 to the method 500, the first response type may be that when the terminal device retransmits the uplink data in a grant-free manner, the network device responds to each of a plurality of retransmissions of the received uplink data sent by the terminal device. For example, the response may be a reply with the ACK or the NACK. In the plurality of retransmissions of the terminal device, RV versions of the uplink data sent by the terminal device for the plurality of times may be completely the same, completely different, or partially the same and partially different. The second response type may be that when the terminal device transmits the uplink data in the grant-free manner, the network device responds to all of a plurality of transmissions of the received uplink data sent in the grant-free manner. Specifically, after receiving and processing the uplink data sent for the plurality of times, the network device may send a response to the terminal device. For example, the response may be a reply with the ACK or the NACK. Certainly, the RV versions of the uplink data that is sent for the plurality of times by the terminal device to a base station herein may be completely the same, completely different, or partially the same and partially different.

The foregoing describes in detail the data transmission methods according to the embodiments of this application with reference to FIG. 1 to FIG. 9. The following describes in detail data transmission apparatuses according to the embodiments of this application with reference to FIG. 10 to FIG. 13.

Figure 10:
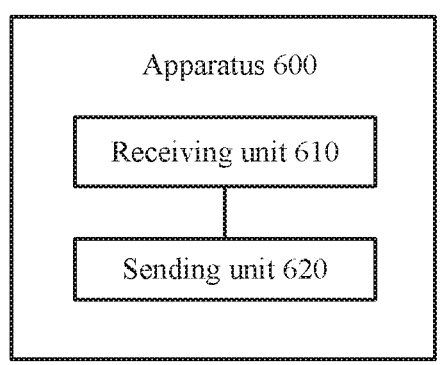
FIG. 10 is a schematic block diagram of a data transmission apparatus according to an embodiment of this application.

FIG. 10 shows a data transmission apparatus 600 according to an embodiment of this application. The apparatus 600 includes:

a receiving unit 610, configured to receive uplink data sent by a terminal device based on a grant-free manner; and a sending unit 620, configured to send a response message for the uplink data to the terminal device according to a type of the response message for the uplink data, where the type of the response message for the uplink data is a first response type or a second response type, the first response type is that each time the terminal device sends the uplink data, the apparatus sends the response message for the uplink data to the terminal device once, and the second response type is that after the terminal device sends the uplink data for a plurality of times, the apparatus sends, to the terminal device once, the response message for the uplink data that is sent for the plurality of times.

In an optional embodiment, the sending unit 620 is further configured to send first indication information to the terminal device before the receiving uplink data sent by a terminal device based on a grant-free manner, where the first indication information is used to indicate that the first response type corresponds to a first transmission resource, and the second response type corresponds to a second transmission resource, where the first transmission resource is different from the second transmission resource.

The apparatus 600 further includes: a determining unit, configured to determine the type of the response message for the uplink data based on a transmission resource used for receiving the uplink data, where the transmission resource for the uplink data is the first transmission resource or the second transmission resource.

In an optional embodiment, the first transmission resource and the second transmission resource are transmission resources in time domain and/or frequency domain; or the first transmission resource and the second transmission resource are demodulation reference signal resources.

In an optional embodiment, the sending unit 620 is specifically configured to send the first indication information to the terminal device by using a system message, radio resource control signaling, or a physical control channel.

In an optional embodiment, the sending unit 620 is further configured to send second indication information to the terminal device before the receiving uplink data sent by a terminal device based on a grant-free manner, where the second indication information is used by the terminal device to determine a response type of the response message for the uplink data In an optional embodiment, the second indication information is used to indicate that the type of the response message for the uplink data is the first response type or the second response type; or the second indication information is used to indicate that the type of the response message for the uplink data is the type of the response message sent for the uplink data by the apparatus when using a grant-based manner with the terminal device for the last time.

In an optional embodiment, the sending unit 620 is specifically configured to send the second indication information to the terminal device by using the system message, the radio resource control signaling, or the physical control channel.

It should be understood that the apparatus 600 herein is embodied in a form of function units. The term "unit" herein may be an application specific integrated circuit (application specific integrated circuit, ASIC), an electronic circuit, a processor (for example, a shared processor, a special-purpose processor, or a group processor) configured to execute one or more software or firmware programs, a memory, a combined logic circuit, and/or another appropriate component that supports the described functions. In an optional example, a person skilled in the art may understand that the apparatus 600 may be specifically the network device in the foregoing method embodiment. The apparatus 600 may be configured to perform procedures and/or steps corresponding to the network device in the foregoing method embodiment. To avoid repetition, details are not described herein again.

Figure 11:
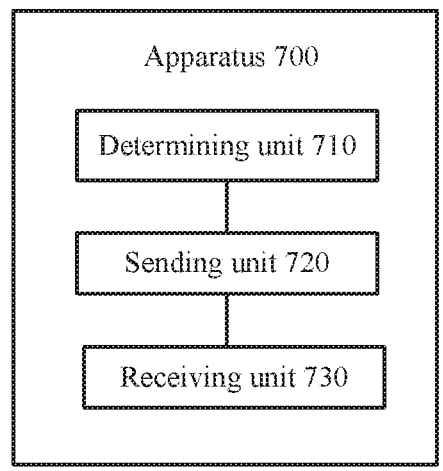
FIG. 11 is a schematic block diagram of another data transmission apparatus according to an embodiment of this application.

FIG. 11 shows a data transmission apparatus 700 according to an embodiment of this application. The apparatus 700) includes:

a determining unit 710, configured to determine a type of a response message for uplink data, where the type of the response message for the uplink data is a first response type or a second response type, the first response type is that each time the apparatus sends the uplink data, the network device sends the response message for the uplink data to the apparatus once, and the second response type is that after the apparatus sends the uplink data for a plurality of times, the network device sends, to the apparatus once, the response message for the uplink data that is sent for the plurality of times;

a sending unit 720, configured to send the uplink data to the network device based on a grant-free manner; and a receiving unit 730, configured to receive, according to the type of the response message for the uplink data, the response message sent by the network device for the uplink data.

In an optional embodiment, the receiving unit 730 is further configured to receive, before the determining a type of a response message for uplink data, first indication information sent by the network device, where the first indication information is used to indicate that the first response type corresponds to a first transmission resource, and the second response type corresponds to a second transmission resource, where the first transmission resource is different from the second transmission resource. The determining unit 710 is further configured to determine, according to the type of the response message for the uplink data, a transmission resource used for sending the uplink data.

In an optional embodiment, the first transmission resource and the first transmission resource are transmission resources in time domain and/or frequency domain: or the first transmission resource and the second transmission resource are demodulation reference signal resources.

In an optional embodiment, the receiving unit 730 is specifically configured to receive the first indication information that is sent by the network device by using a system message, radio resource control signaling, or a physical control channel.

In an optional embodiment, the receiving unit 730 is further configured to receive, before the determining a type of a response message for uplink data, second indication information sent by the network device.

The determining unit 710 is specifically configured to determine the type of the response message for the uplink data according to the second indication information.

In an optional embodiment, the second indication information is used to indicate that the type of the response message for the uplink data is the first response type or the second response type; or the second indication information is used to indicate that the type of the response message for the uplink data is the type of the response message sent for the uplink data by the network device when using a grant-based manner with the apparatus for the last time.

In an optional embodiment, the receiving unit 730 is specifically configured to receive the second indication information that is sent by the network device by using the system message, the radio resource control signaling, or the physical control channel.

It should be understood that the apparatus 700 herein is embodied in a form of function units. The term "unit" herein may be an application specific integrated circuit (application specific integrated circuit, ASIC), an electronic circuit, a processor (for example, a shared processor, a special-purpose processor, or a group processor) configured to execute one or more software or firmware programs, a memory, a combined logic circuit, and/or another appropriate component that supports the described functions. In an optional example, a person skilled in the art may understand that the apparatus 700 may be specifically the terminal device in the foregoing method embodiment. The apparatus 700 may be configured to perform the procedures and/or steps corresponding to the terminal device in the foregoing method embodiment. To avoid repetition, details are not described herein again.

The foregoing apparatus 600 or apparatus 700 completely corresponds to the network device or the terminal device in the method embodiment, and a corresponding step is performed by a corresponding unit. For example, a transceiver unit performs a receiving/sending step in the method embodiment, and other steps than the receiving/sending step may be performed by a processing module. For detailed functions of a module, refer to a corresponding method embodiment. Details are not described again.

The network device and the terminal device in each of the foregoing solutions have functions for implementing corresponding steps performed by the network device and the terminal device in the foregoing method. The functions may be implemented by hardware, or may be implemented by corresponding software executed by hardware. The hardware or the software includes one or more modules corresponding to the functions. For example, a sending unit may be replaced with a transmitter, a receiving unit may be replaced with a receiver, and another unit such as a determining unit may be replaced with a processor, to respectively perform a receiving/sending operation and a related processing operation in each method embodiment.

Figure 12:
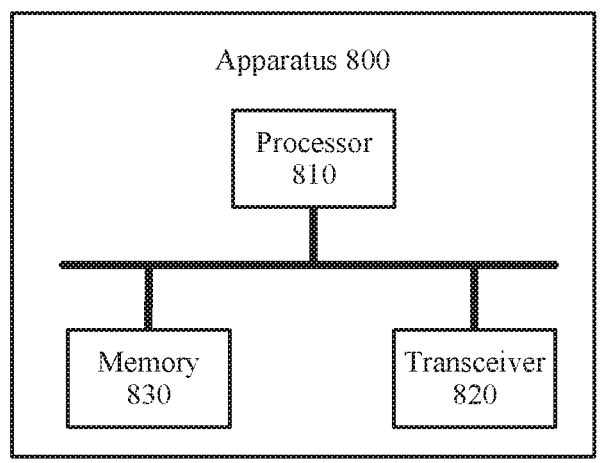
FIG. 12 is a schematic block diagram of still another data transmission apparatus according to an embodiment of this application.

FIG. 12 shows still another data transmission apparatus 800 according to an embodiment of this application. The apparatus 800 includes a processor 810, a transceiver 820, and a memory 830. The processor 810, the transceiver 820, and the memory 830 communicate with each other by using an internal connection path. The memory 830 is configured to store an instruction. The processor 810 is configured to execute the instruction stored in the memory 830, to control the transceiver 820 to send a signal and/or receive a signal.

The transceiver 820 is configured to receive the uplink data that is sent by the terminal device based on a grant-free manner. The transceiver 820 is further configured to send a response message for the uplink data to the terminal device according to a type of the response message for the uplink data, where the type of the response message for the uplink data is a first response type or a second response type, the first response type is that each time the terminal device sends the uplink data, the apparatus sends the response message for the uplink data to the terminal device once, and the second response type is that after the terminal device sends the uplink data for a plurality of times, the apparatus sends, to the terminal device once, the response message for the uplink data that is sent for the plurality of times.

It should be understood that the apparatus 800 may be specifically the network device in the foregoing method embodiment, and may be configured to perform steps and/or procedures corresponding to the network device in the foregoing method embodiment. Optionally, the memory 830 may include a read-only memory and a random access memory, and provide an instruction and data to the processor. A part of the memory may further include a non-volatile random access memory. For example, the memory may further store device type information. The processor 810 may be configured to execute the instruction stored in the memory; and when the processor 810 executes the instruction stored in the memory, the processor 810 is configured to perform the steps and/or the procedures corresponding to the network device in the foregoing method embodiment.

Figure 13:
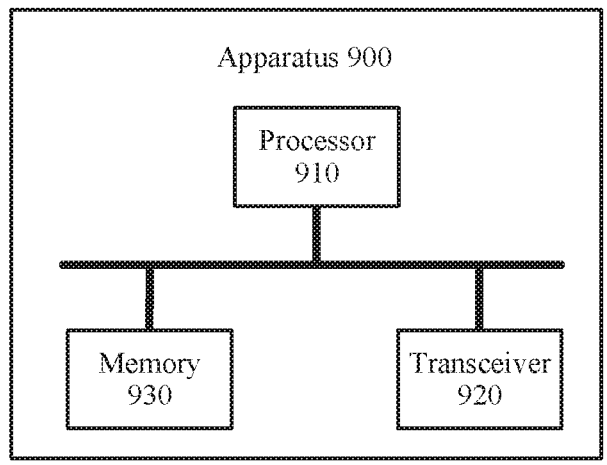
FIG. 13 is a schematic block diagram of still another data transmission apparatus according to an embodiment of this application.

FIG. 13 shows still another data transmission apparatus 900 according to an embodiment of this application. The apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or receive a signal.

The processor 910 is configured to determine a type of a response message for uplink data, where the type of the response message for the uplink data is a first response type or a second response type, the first response type is that each time the apparatus sends the uplink data, the network device sends the response message for the uplink data to the apparatus once, and the second response type is that after the apparatus sends the uplink data for a plurality of times, the network device sends, to the apparatus once, the response message for the uplink data that is sent for the plurality of times. The transceiver 920 is configured to send the uplink data to the network device based on a grant-free manner. The transceiver 920 is further configured to receive, according to the type of the response message for the uplink data, the response message sent by the network device for the uplink data.

It should be understood that the apparatus 900 may be specifically the terminal device in the foregoing method embodiment, and may be configured to perform steps and/or procedures corresponding to the terminal device in the foregoing method embodiment. Optionally, the memory 930 may include a read-only memory and a random access memory, and provide an instruction and data to the processor. A part of the memory may further include a non-volatile random access memory. For example, the memory may further store device type information. The processor 910 may be configured to execute the instruction stored in the memory; and when the processor 910 executes the instruction stored in the memory, the processor 910 is configured to perform the steps and/or the procedures corresponding to the terminal device in the foregoing method embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It should be understood that the transceiver may include a transmitter and a receiver. The transceiver may further include an antenna. There may be one or more antennas. The memory may be an independent device, or may be integrated into the processor. All or some of the foregoing devices may be integrated into a chip for implementation, for example, integrated into a baseband chip for implementation.

It should be understood that, in the embodiments of this application, the processor of the apparatus may be a central processing unit (central processing unit, CPU), or the processor may be another general-purpose processor, a digital signal processor (digital signal processor, DSP), an application specific integrated circuit (application specific integrated circuit, ASIC), a field-programmable gate array (field-programmable gate array, FPGA) or another programmable logic device, a discrete gate or a transistor logic device, a discrete hardware component, and the like. The general purpose processor may be a microprocessor, or the processor may be any conventional processor and the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, a register, and the like. The storage medium is located in the memory, and a processor executes instructions in the memory and completes the steps in the foregoing methods in combination with hardware of the processor. To avoid repetition, details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave, and the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, implemented by a terminal device, wherein the data transmission method comprises:
   receiving first indication information from a network device;
   determining a type of a response message for uplink data according to the first indication information, wherein the type of the response message for the uplink data is a first response type or a second response type, wherein the first response type is that each time the terminal device sends the uplink data, the network device sends the response message for the uplink data to the terminal device once, and wherein the second response type is that, after the terminal device sends the uplink data a plurality of times, the network device sends the response message to the terminal device once for the uplink data that is sent for the plurality of times;
   sending the uplink data to the network device based on a grant-free manner; and
   receiving, according to the type of the response message for the uplink data, the response message from the network device for the uplink data.

2. The data transmission method of claim 1, wherein before determining the type of the response message for the uplink data, the data transmission method further comprises:
   receiving second indication information from the network device, wherein the second indication information indicates that the first response type corresponds to a first transmission resource, wherein the second response type corresponds to a second transmission resource, and wherein the first transmission resource is different from the second transmission resource; and
   determining, according to the type of the response message for the uplink data, a transmission resource used for sending the uplink data.

3. The data transmission method of claim 2, wherein the first transmission resource and the second transmission resource are in a time domain.

4. The data transmission method of claim 2, wherein receiving the second indication information from the network device comprises receiving the second indication information from the network device using one of a system message, radio resource control signaling, or a physical control channel.

5. The data transmission method of claim 2, wherein the first transmission resource and the second transmission resource are in a frequency domain.

6. The data transmission method of claim 2, wherein the first transmission resource and the second transmission resource are demodulation reference signal resources.

7. The data transmission method of claim 1, wherein the first indication information indicates that the type of the response message for the uplink data is the first response type or the second response type.

8. The data transmission method of claim 1, wherein the first indication information indicates that the type of the response message for the uplink data is the type of the response message sent for the uplink data by the network device when using a grant-based manner with the terminal device for a last time.

9. A data transmission apparatus, comprising:
a receiver configured to receive uplink data from a terminal device based on a grant-free manner; and
a transmitter coupled to the receiver and configured to:
send first indication information to the terminal device before receiving the uplink data from the terminal device based on the grant-free manner, wherein the first indication information is for determining a type of a response message for the uplink data; and
send the response message for the uplink data to the terminal device according to the type of the response message for the uplink data, wherein the type of the response message for the uplink data is a first response type or a second response type, wherein the first response type is that each time the terminal device sends the uplink data, the data transmission apparatus sends the response message for the uplink data to the terminal device once, and wherein the second response type is that, after the terminal device sends the uplink data for a plurality of times, the data transmission apparatus sends the response message to the terminal device once for the uplink data that is sent for the plurality of times.

10. The data transmission apparatus of claim 9, wherein the transmitter is further configured to send second indication information to the terminal device before receiving the uplink data from the terminal device based on the grant-free manner, wherein the second indication information indicates that the first response type corresponds to a first transmission resource, wherein the second response type corresponds to a second transmission resource, wherein the first transmission resource is different from the second transmission resource, wherein the data transmission apparatus further comprises a processor coupled to the transmitter and the receiver and configured to determine the type of the response message for the uplink data based on a transmission resource used for receiving the uplink data, and wherein the transmission resource for the uplink data is the first transmission resource or the second transmission resource.

11. The data transmission apparatus of claim 10, wherein the first transmission resource and the second transmission resource are in a time domain or a frequency domain, or wherein the first transmission resource and the second transmission resource are demodulation reference signal resources.

12. The data transmission apparatus of claim 10, wherein the transmitter is further configured to send the second indication information to the terminal device using one of a system message, radio resource control signaling, or a physical control channel.

13. The data transmission apparatus of claim 9, wherein the first indication information indicates that the type of the response message for the uplink data is the first response type or the second response type, or wherein the first indication information indicates that the type of the response message for the uplink data is the type of the response message sent for the uplink data by the data transmission apparatus when using a grant-based manner with the terminal device for a last time.

14. The data transmission apparatus of claim 9, wherein the transmitter is further configured to send the first indication information to the terminal device using one of a system message, radio resource control signaling, or a physical control channel.

15. A data transmission apparatus, comprising:
a processor configured to determine a type of a response message for uplink data according to first indication information, wherein the type of the response message for the uplink data is a first response type or a second response type, wherein the first response type is that each time the data transmission apparatus sends the uplink data, a network device sends the response message for the uplink data to the data transmission apparatus once, and wherein the second response type is that, after the data transmission apparatus sends the uplink data for a plurality of times, the network device sends the response message to the data transmission apparatus once for the uplink data that is sent for the plurality of times;
a transmitter coupled to the processor and configured to send the uplink data to the network device based on a grant-free manner; and
a receiver coupled to the processor and configured to:
receive the first indication information from the network device before the processor determines the type of the response message for the uplink data; and
receive, according to the type of the response message for the uplink data, the response message from the network device for the uplink data.

16. The data transmission apparatus of claim 15, wherein before the processor determines the type of the response message for the uplink data, the receiver is further configured to receive second indication information from the network device, wherein the second indication information indicates that the first response type corresponds to a first transmission resource, and wherein the second response type corresponds to a second transmission resource, wherein the first transmission resource is different from the second transmission resource, and wherein the processor is further configured to determine, according to the type of the response message for the uplink data, a transmission resource used for sending the uplink data.

17. The data transmission apparatus of claim 16, wherein the first transmission resource and the second transmission resource are in a time domain or a frequency domain, or wherein the first transmission resource and the second transmission resource are demodulation reference signal resources.

18. The data transmission apparatus of claim 16, wherein the receiver is further configured to receive the second indication information that is from the network device using one of a system message, radio resource control signaling, or a physical control channel.

19. The data transmission apparatus of claim 15, wherein the first indication information indicates that the type of the response message for the uplink data is the first response type or the second response type, or wherein the first indication information indicates that the type of the response message for the uplink data is the type of the response message sent for the uplink data by the network device when using a grant-based manner with the data transmission apparatus for a last time.

20. The data transmission apparatus of claim 15, wherein the receiver is further configured to receive the first indication information that is from the network device using one of a system message, radio resource control signaling, or a physical control channel.

* * * * *